United States Patent [19]

Blume et al.

[11] Patent Number: 5,030,356
[45] Date of Patent: Jul. 9, 1991

[54] PROCESS FOR RECOVERING ORGANIC COMPONENTS FROM LIQUID STREAMS

[75] Inventors: Ingo Blume, Hengelo, Netherlands; Richard W. Baker, Palo Alto, Calif.

[73] Assignee: Membrane Technology & Research, Inc., Menlo Park, Calif.

[21] Appl. No.: 359,739

[22] Filed: May 31, 1989

[51] Int. Cl.$^5$ .............................................. B01D 61/36
[52] U.S. Cl. ..................................... 210/640; 210/641
[58] Field of Search ...................... 210/640, 641, 651; 203/39

[56] References Cited

U.S. PATENT DOCUMENTS

| | | | |
|---|---|---|---|
| 2,475,990 | 7/1949 | Robertson | 210/640 X |
| 2,953,502 | 9/1960 | Binning et al. | 202/42 |
| 4,035,291 | 7/1977 | Chiang et al. | 210/640 X |
| 4,218,312 | 8/1980 | Perry | 210/22 |
| 4,311,594 | 1/1982 | Perry | 210/640 |
| 4,399,288 | 8/1983 | McClure | 548/239 |
| 4,405,409 | 9/1983 | Tusel et al. | 203/19 X |
| 4,806,245 | 2/1989 | Boddeker | 210/640 |

FOREIGN PATENT DOCUMENTS 3410155  8/1985  Fed. Rep. of Germany ........ 203/39

OTHER PUBLICATIONS

M. Goncalves et al., "Pervaporation and Dialysis of Water-Ethanol Solution Using Silicone Rubber Membranes", Sep. Sci. & Tech., 18, 893–904, 1983.

J. P. Brunet et al., "Sorption and Pervaporation of Dilute Aqueous Solutions of Organic Compounds Through Polymer Membranes," J. Mem. Sci., 25, 55–100, 1985.

Primary Examiner—Frank Spear
Attorney, Agent, or Firm—J. Farrant

[57] ABSTRACT

A separation process for recovering organic components from liquid streams. The process is a combination of pervaporation and decantation. In cases where the liquid stream contains the organic to be separated in dissolved form, the pervaporation step is used to concentrate the organic to a point above the solubility limit, so that a two-phase permeate is formed and then decanted. In cases where the liquid stream is a two-phase mixture, the decantation step is performed first, to remove the organic product phase, and the residue from the decanter is then treated by pervaporation. The condensed permeate from the pervaporation unit is sufficiently concentrated in the organic component to be fed back to the decanter. The process can be tailored to produce only two streams: an essentially pure organic product stream suitable for reuse, and a residue stream for discharge or reuse.

12 Claims, 4 Drawing Sheets

PROCESS FOR RECOVERING ORGANIC COMPONENTS FROM LIQUID STREAMS

This invention was made with Government support under Contract Number DE-AC03-83ER13054, awarded by the Department of Energy. The Government has certain rights in this invention.

FIELD OF THE INVENTION

The invention relates to a separation process for removing and recovering organic components present in industrial process or waste streams. More particularly, the invention relates to a hybrid separation process incorporating both a pervaporation stage and a decantation stage.

BACKGROUND OF THE INVENTION

1. Separation of liquid mixtures

Separation of liquid dispersions or mixtures may be achieved by a number of techniques, including simple gravity separation (decantation), centrifugal separation, impaction methods such as coalescing or flotation, and electrotreating. Of these, by far the cheapest and simplest under most circumstances is decantation. For decantation to be effective, however, the concentration of the minor phase should be relatively high, and the dispersed phase should be present in the form of relatively large droplets. Also, decanters can typically achieve only a gross separation between phases. Even when an optimum phase separation is achieved, the dispersed phase may be slightly soluble in the continuous phase, so that a total separation of the two components is not possible. Therefore, it is frequently necessary to subject the residue from the decanter to some form of secondary separation process. Where large volumes of liquid are to be treated, the space required for the decanter vessels may be a problem. Thus, to take advantage of the cheap, simple aspects of decantation as a separation process requires:

1. A relatively concentrated mixture,
2. A relatively small feed volume, if possible, and
3. A second polishing step for optimum separation.

2. Treatment of streams containing dissolved organics

Contamination of industrial effluent waters with dissolved organic solvents, such as methanol, ethanol, methyl ethyl ketone, phenol, benzene, toluene, and trichloroethane, is an important environmental problem. These solvents make water unfit for reuse or direct discharge to municipal sewers, and are difficult to remove, even at low concentrations. Commonly used methods for removing volatile organic compounds include air stripping, biological treatment, carbon adsorption and incineration. Air stripping, in which water is circulated against a current of air in a contacting tower, is the least expensive process. However, air stripping merely exchanges water pollution for air pollution. Air stripping is therefore seldom used if the solvent concentration exceeds 0.1%, and even then only for small streams where the total organic emission is less than 10-100 lb/day. Carbon adsorption, a principal effluent treatment technology, can only be used efficiently for very dilute streams, typically 1,000 ppm or less, and more usually 100 ppm or less. At these very low concentrations, carbon adsorption is a preferred technique, because the size of the plant scales in proportion to the amount of solvent removed. Thus, when the solvent concentration is very low, the amount of wastewater that can be treated by a small carbon adsorption system is high. However, once the feed solution concentration exceeds 1,000 ppm, carbon adsorption systems become very large per gallon of wastewater treated. Also, carbon adsorption systems cannot handle some chlorinated and fluorinated solvents, and generate secondary waste, in the form of spent contaminated carbon that may be sent to landfills. Biological treatment systems work well only for organics that can be fully metabolized by the biomass, and where the process is not compromised by high or fluctuating solvent concentrations. At the high concentration end of the scale, incineration is reliable and effective for very concentrated streams, where the heat value of the solvent reduces the amount of supplemental fuel required. Typically, incineration is impossibly expensive at concentrations below 5%.

Thus, there is a dissolved organic concentration range for which no conventional wastewater treatment method is really suited. Currently this range is avoided by pooling or diluting the waste to the point where it can be treated by carbon adsorption or biological processes, or concentrating it so that incineration can be used. There remains a real and long-felt need for a low-cost method for directly treating contaminated streams, with an organic content of about 0.1% up to about 5 or 10%, to produce an effluent suitable for direct discharge or biological treatment, and a low-volume concentrated stream containing the bulk of the dissolved organics, from which the organic component can be recovered. Likewise, there is a need for efficient methods of separating organic/organic process streams or wastes, particularly where the two organics form an azeotrope or a closely-boiling mixture.

Pervaporation is a relatively new separation technology that is beginning to achieve commercial success. The pervaporation process itself has been known since the 1950s, and is described, for example, in U.S. Pat. Nos. 2,913,507 and 2,953,502 to Binning et al. Organic-selective pervaporation is described in a general way in U.S. Pat. No. 4,218,312 to Perry. Despite the theoretical knowledge embodied in these patents, many years elapsed before commercially viable pervaporation systems could be contemplated, because the technology to make high performance membranes and modules had not been developed. In recent years, a West German company, GFT GmbH, has been selling pervaporation units with water-selective membranes to remove small amounts of dissolved water from solvents. Membrane Technology & Research, Inc., now offers systems with organic-selective membranes for a variety of applications. Work on organic/organic separations by pervaporation is ongoing in several institutions.

SUMMARY OF THE INVENTION

The invention is a separation process involving both pervaporation and decantation. This combination of processes can treat aqueous streams containing dissolved organic chemicals, to produce an effluent stream clean enough for direct discharge, and a product stream containing essentially pure organic. The pervaporation step is used to produce a permeate stream sufficiently concentrated in organic for treatment by decantation, and an organic-depleted residue stream for discharge. The decantation step is used to produce a high-purity organic phase, suitable for reuse, and an aqueous phase, typically saturated with organic, that can be recycled to the inlet of the pervaporation unit. In this way, both the concentration and the polishing requirements associated with decantation are achieved by a single, simple process. The invention enables wastewater streams polluted with organic contaminants to be treated economically and effectively with no secondary pollution problems. The only products from the hybrid process are a water residue clean enough for direct discharge and a high-purity organic stream for reuse in the process generating the waste. In many cases, the value of the recovered organic will partially or fully offset the cost of the separation process. Thus, economic as well as environmental motivation to comply with pollution control standards can be provided.

The process of the invention could also be used to separate organic streams containing two organic components of different volatilities and densities, or streams in which water is to be separated from an organic liquid. For simplicity of discussion, the general and detailed descriptions that follow concern removal of organic materials from water. However, the invention should be construed as pertaining equally to removal of one organic from another, or of water from an organic stream. The process of the invention involves running a liquid feedstream, containing one or more organic components, through a membrane pervaporation system incorporating membranes that are selectively permeable to an organic component of the feedstream. The permeating vapor, which is enriched in the preferentially permeating organic compared with the feed, is condensed and then decanted. The more dense and less dense phases are retrieved separately. The pervaporation system may contain one or more membrane modules. The system may be a simple system, in which the feed passes through one module, or a parallel array of modules, to produce an organic-depleted residue and a permeate for decanting. Other possible arrangements include multistage or multistep systems. In a multistage system, the permeate from one stage becomes the feed for the next. Each stage may contain one or more modules, and the modules in one stage may or may not be the same as those in another. Typically, a much smaller membrane area is required in the second stage than in the first, because the volume of liquid to be treated is much smaller. Multistage systems are appropriate where a single stage would produce an inadequately concentrated permeate. In a multistep system, the residue from the first step becomes the feed for the second. The modules used in the second step may or may not be the same as those in the first. Multistep systems are typically used where a very high percentage of organic removal from the feed is desired. Systems can, of course, incorporate both multiple stages and multiple steps.

The permeate vapor may also be condensed in one or multiple condensers. If more than one condenser is used before the decanter, they may be operated at different temperatures to produce fractions with varying organic concentrations. The system design will be tailored to take account of the concentration and solubility of the organic component in the feed, the degree of removal required, and the desired permeate concentration for decantation.

The process of the invention may also be carried out by performing the decantation step first, then treating the phase containing the desired organic in dissolved form by pervaporation. This variation of the process would be useful, for example, where the original feedstream contains a quantity of organic above the solubility limit. The decantation step could produce an essentially pure organic product, and a second stream containing dissolved organic. The pervaporation step would then be used to generate a permeate stream with excess organic that could be fed back to the decanter, and a reject stream for discharge or final polishing.

The permselective membranes used in the invention may be homogeneous membranes, asymmetric membranes, composite structures, or any form of separation membrane known in the art. They should be selectively permeable to organic liquids, with a high flux for the permeating component. To achieve a high flux, it is desirable to make the permselective membrane layer very thin. A preferred embodiment of the invention involves the use of a composite membrane comprising a microporous support, onto which the permselective layer is deposited as an ultrathin coating. The preparation of such membranes is known in the art. The membrane configuration is not critical to the invention. In a preferred embodiment, the membranes are cast and coated as flat sheets, and then rolled into spiral-wound modules. However, other types of configuration, such as hollow fibers, plate-and-frame, or flat sheet membranes are also possible and are intended to be within the scope of the invention.

Transport through the membrane is induced by maintaining the vapor pressure on the permeate side of the membrane lower than the vapor pressure of the feed liquid. This vapor pressure difference may be achieved by cooling and condensing the permeate vapor, for example. The pervaporation process should be designed so that the proportions of organic and water, for example, in the permeate vapor are such that, on condensation, the amount of organic present in the permeate is greater than can be dissolved in the water. The condensate then forms a liquid mixture or dispersion, which can be passed to a decanter operating in batch or continuous mode for phase separation. The high purity organic phase from the decanter can be reused. The aqueous phase, typically saturated with organic, can be fed back to the feed side of the pervaporation unit.

It is an object of the invention to provide a process for efficiently removing organic contaminants from aqueous streams.

It is an object of the invention to provide a process for efficiently recovering organic compounds from aqueous streams.

It is an object of the invention to provide for efficiently separating mixed organic liquid streams.

It is an object of the invention to provide a process for treating aqueous streams containing 0.1% to 5-10% organic liquids at their source point.

It is an object of the invention to provide a process that can treat aqueous streams containing 0.1% to 5-10% organic liquids without the need for predilution or concentration of the feedstream.

It is an object of the invention to provide a process that can yield a high-purity organic product.

It is an object of the invention to provide a process that can remove at least 90% of the organic content of an aqueous stream.

It is an object of the invention to provide a combined pervaporation/decantation process.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

Figure 1:
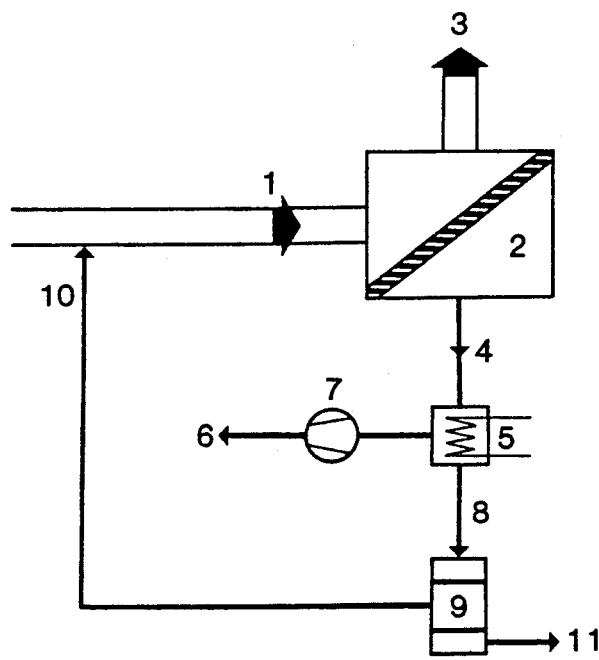
FIG. 1 is a schematic showing a basic embodiment of the invention.

The term vapor as used herein refers to organic compounds in the gaseous phase below their critical temperatures.

The term permselective as used herein refers to polymers, or membranes made from those polymers, that exhibit selective permeation for at least one component of a feed liquid over the other components of the feed liquid, enabling a measure of separation between the components to be achieved.

The term selectivity as used herein means the ratio of membrane permeability for one component over another.

The term multilayer as used herein means comprising a support membrane and one or more coating layers.

The term decantation as used herein means gravity-driven phase separation of a liquid having an aqueous phase and a non-dissolved organic phase.

The term decanter as used herein means a vessel in which gravity-driven phase separation of a liquid mixture occurs.

The feedstreams that can be treated by the process of the present invention may arise from a variety of sources. Industrial effluent streams contaminated with hazardous and toxic organic chemicals are prime candidates for treatment. Wastewaters from food or beverage processing, containing alcohols, flavor essences or other organic components could also be treated to recover the organics. Internal industrial process streams, containing solvents, process reaction products or the like could also be treated. The scope of the invention is not intended to be limited to any particular streams, but to encompass any situation where a stream containing dissolved organic chemicals is found. Streams containing a few ppm organic can be treated, as can those that contain the organic in concentrations well above the solubility limit in the solvent in question. Representative organic materials that may be separated from the feedstream by the process of the invention include, but are not limited to, phenols, toluenes, benzenes, xylenes, cresols, esters, such as ethyl acetate or butyl acetate, chlorinated hydrocarbons, such as perchloroethylene, trichloroethylene, trichloroethane, chlorinated fluorocarbons, ketones, such as methyl ethyl ketone, alcohols, such as butanol, hexanol or octanol, naphthas and aliphatic hydrocarbons, such as hexane, octane or decane, or terpenes, such as those found in various wood product streams.

The invention is a separation process involving both pervaporation and decantation. The pervaporation step is used to produce a stream sufficiently concentrated in the organic to be separated by decantation. Alternatively, the decantation step can be carried out first, and the waste stream from the decanter can be treated by pervaporation. Pervaporation is a low-pressure membrane process that can be used to separate components of differing volatilities from solutions. A permselective membrane performs the separation. The membranes for use in the process of the invention should be selectively permeable to organics over water, or to the organic to be separated over other organics. Some membrane materials, particularly rubbery polymers, possess an intrinsically high selectivity for organic solvents over water and can therefore be used in the pervaporation step of the invention. Preferred permselective membrane materials include rubbery non-crystalline polymers, with glass transition temperatures below the normal operating temperature of the system. Thermoplastic elastomers are also useful. These polymers combine hard and soft segments or domains in the polymer structure. Provided the soft segments are rubbery at the temperature and operating conditions of the invention, polymers of this type could make suitable membranes for use in the invention. Polymers that may be used include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, polyesteramides, and block copolymers of polyethers and polyesters. Most preferred membrane materials are polystyrene-butadiene block copolymers or silicone rubbers. The membrane may take the form of a homogeneous membrane, an asymmetric membrane, a multilayer composite membrane, a matrix incorporating a gel or liquid layer, or any other form known in the art. A particularly preferred embodiment of the invention employs a multilayer membrane comprising a microporous support onto which is coated the ultrathin permselective layer. The microporous support membrane should have a flow resistance that is very small compared to the permselective layer. Preferably the pores in the skin layer should be less than 1 micron in diameter, to enable it to be coated with a defect-free permselective layer. A preferred support membrane is an asymmetric Loeb-Sourirajan type membrane, which consists of a relatively open, porous substrate with a thin, dense, finely porous skin layer. The support membrane should resist the solvents used in applying the permselective layer. Polymers that may be used to make the microporous support membrane include, for example, polysulfone, polyimide, polyvinylidene fluroide, polyamides, polypropylene or polytetrafluoroethylene. Other polymers suitable for making support membranes are listed in U.S. Pat. No. 4,230,463, column 21, lines 8 through 23, incorporated herein by reference. Commercially available asymmetric ultrafiltration membranes, for example, NTU ® 4220 (crosslinked polyimide), or NTU ® 3050 (polysulfone) from Nitto Electric Industrial Company, Osaka, Japan, could also be used as the support membrane. The thickness is not critical, since the permeability of the support is high compared to that of the permselective layer. A typical support would have a thickness in the range about 100 to 300 microns.

Optionally, the support membrane may be reinforced by casting it on a fabric web. The multilayer membrane then comprises the web, the microporous membrane, and the ultrathin permselective membrane. The web material may be, for example, a polyester such as Hollytex, available from Eaton-Dikeman, Mt. Holly Springs, Penn. The permselective layer could not be cast directly on the fabric web, because it would penetrate the web material, rather than forming an unbroken surface coating.

The preparation of membranes having a microporous support is described, for instance, in U.S. Pat. No. 4,553,983, incorporated herein by reference. Typically, the membranes are prepared in two steps. To form the microporous support membrane, a casting solution, consisting of a polymer solution dissolved in a water-miscible solvent, is doctored onto the moving web. The belt passes into a water bath which precipitates the polymer to form the microporous membrane. The belt is then collected on a take-up roll, after which the membrane is washed to remove any remaining solvent, dried to form the membrane, and wound up on a roll. In a second step, the microporous membrane from the feed roll passes through a dip-coating station, then a drying oven and is wound up on a product roll. The dip-coating tank contains a dilute solution of the polymer and coats the traveling microporous membrane with a liquid layer, 50- to 100 μm thick. After evaporation of the solvent, a very thin polymer film is left on the membrane.

The membrane is incorporated into membrane modules, which are the key elements of the pervaporation system. The membrane configuration is not critical to the invention. In a preferred embodiment, the membranes are cast and coated as flat sheets, as described above, and then rolled into spiral-wound modules. However, other types of configuration, such as hollow fibers, plate-and-frame, or flat sheet membranes are also possible and are intended to be within the scope of the invention. The preparation of spiral-wound modules is described, for example, in U.S. Pat. No. 3,966,616, incorporated herein by reference. The preparation of hollow-fiber membranes and modules is described, for example, in U.S. Pat. Nos. 3,798,185 to Skiens and 4,230,463 to Henis et al.

In the pervaporation step, the feedstream is introduced into an array of one or more membrane modules. Organic components and some water pass through the membrane as vapors. Transport through the membrane is induced by maintaining the vapor pressure on the permeate side of the membrane lower than the vapor pressure of the feed liquid. On the feed side of the membrane, the partial vapor pressure of any component will be the partial pressure of the vapor in equilibrium with the feed solution. Changing the hydrostatic pressure of the feed solution thus has a negligible effect on transmembrane flux or selectivity. On the other hand, changing the permeate pressure has a major effect on flux. The vapor pressure on the permeate side can be reduced in several ways, for example, by drawing a vacuum on the permeate side of the membrane, by sweeping the permeate side to continuously remove permeating vapor, or by cooling the permeate vapor stream to induce condensation. The feed solution may also be heated. In this process, sometimes called thermopervaporation, the driving force is the difference in vapor pressure between the hot feed solution and the cold permeate liquid. In the context of the present invention, the most simple and convenient method is cooling and condensation, because the permeate has to be condensed before passing to the decanter in any case. The process in a basic embodiment is illustrated schematically in FIG. 1. Referring now to this figure, feedstream, 1, comprising an organic solvent in water, is brought into contact with membrane unit, 2. Organic solvent and water vapor permeate the membrane, the organic solvent permeating preferentially. The non-permeating portion of the feedstream is removed as a liquid residue stream, 3. The non-permeating liquid residue has a lower organic content than the feed. Typically the pervaporation process should remove 80–90% of the organic content of the feed, and most preferably 95% or more. The permeate vapor stream, 4, should contain organic and water in proportions such that, after condensation, there is more organic present than can be dissolved in the water. Most preferably the organic content of the condensed permeate vapor should be at least 50% greater than can be dissolved under the operating conditions of the system. The permeate vapor is cooled in condenser, 5. The condenser may be operated by using cooling water available on site, or may have a built-in chiller. The non-condensed fraction, 6, of the permeate vapor, comprised of non-condensable gases such as oxygen or nitrogen, that may have been present in the feed, is removed by a small vacuum pump, 7. The condensed permeate liquid, 8, comprises two phases, formed as a result of the mutual solubilities of the aqueous and organic components: an aqueous phase that would normally be saturated with organic, and an organic phase that is essentially pure, containing only some dissolved water. The two-phase permeate liquid mixture passes to a decanter, 9, for phase separation. The decanter may take the form of a horizontal or vertical settling vessel, a trough separator, or a vessel with internal fins, plates or other structure to encourage phase separation. Design and operation of decanters is well known in the art. A number of decanter types, and the design and operating parameters that must be taken into account in their selection and use, are discussed, for example, in *Handbook of Separation Process Technology*, R. W. Rousseau (Ed.), pages 148–157, which are incorporated herein by reference. Decantation can be carried out in batch mode or in continuous mode. Batch mode operation is simpler, because problems brought about by turbulence in the vessel are avoided. The settling time, t, in the vessel is given by $H/U_t$, where H is the farthest distance that a droplet of the dispersed phase must travel to reach the phase interface, and $U_t$ is the Stokes Law settling velocity, which depends on the drop size, densities and viscosities of the phases. However, a single vessel operating in batch mode is only appropriate if the pervaporation process is also performed non-continuously. If the pervaporation step is continuous, then the permeate liquid stream may be switched between multiple decanters, where it is left to settle and drawn off after an appropriate time, or the decanter may be run continuously. For continuous operation, the overflow rate, vessel shape, and feed and outlet geometries should be designed to minimize turbulence or entrainment of the light phase into the heavy phase at the phase interface. The Rousseau reference cited above discusses these issues in detail. The organic phase, 11, withdrawn from the decanter has a purity greater than 90%, preferably greater than 95%, and most preferably greater than 98%. The aqueous phase, 10, saturated with organic, may conveniently, although not necessarily, be mixed with the incoming feedstream to the system and reprocessed through the pervaporation unit. The basic embodiment of FIG. 1 is especially appropriate for handling streams where the organic component is a hydrophobic, sparingly water-soluble substance, and the other phase is aqueous. In this case, very high membrane selectivities are possible. For example, a concentration of 50-200 fold or above can be obtained by pervaporation for solvents such as benzene or 1,1,2-trichloroethane. Not only are the membrane selectivities high, but the high concentration of organic in the permeate, the low solubility, and the difference in properties of the two liquids, facilitates the decantation step.

It will be appreciated that in practice the system design will depend on the volume of feed to be treated, the concentration of organic in the feed, the percentage of organic recovery required and the flux and selectivity of the modules. For example, in applications where feedstreams with very dilute concentrations of organic are to be treated, and where maximum organic recovery is imperative, modules having high selectivity but relatively low flux may be best. Where large volumes of waste are to be processed, but a lesser degree of retentate purity is acceptable, high-flux, moderate selectivity modules may be preferred. The membrane area, and hence the number of modules in the system, will also vary widely. For instance, a small-scale unit designed to treat a feed flow of 10 L/min or less, containing a few percent organic, with 90% organic recovery, could operate with one spiral-wound module having a membrane area of about 5-6 m$^2$. A commercial plant capable of handling 100,000 gallons of feed per day, and reducing the organic concentration in the residue from 0.1% to 0.01%, may demand a membrane area of 300-400 m$^2$, or 60 or more 6-m$^2$ modules. The scope of the invention should not be understood as limited to any particular type or number of modules, or other system components, as the design details of the process as carried out for any particular application will be tailored to suit that application.

Figure 2:
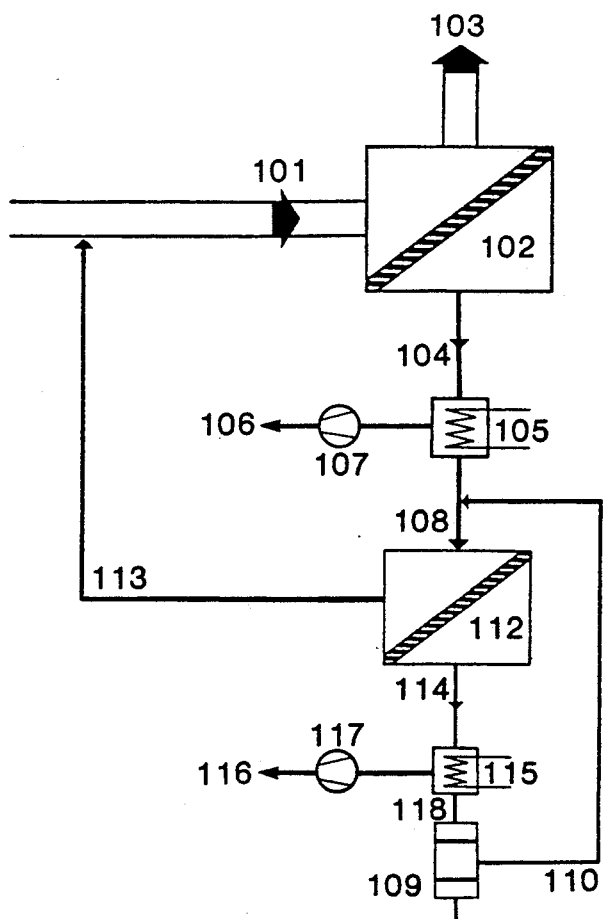
FIG. 2 is a schematic showing an embodiment of the invention incorporating a two-stage membrane unit.

There will be cases where the permeate from a single pervaporation step is unsuitable for decantation, because the ratio of organic to water is low, or because the organic is relatively soluble in water, for example. An alternative embodiment, involving a two-stage pervaporation process, may then be used, in which the permeate from the first stage becomes the feed to the second stage. If the enrichment of each stage is 20 fold, for example, then the overall enrichment with both stages is approximately 400 fold. The feedstream to the second stage is very much smaller than the feed to the first, so the second stage is typically only 10-20% as large as the first stage. An example of this type of two-stage process is shown in FIG. 2. Referring to this figure, feedstream, 101, comprising an organic solvent in water, is brought into contact with membrane unit, 102. Organic solvent and water vapor permeate the membrane, the organic solvent permeating preferentially. The non-permeating portion of the feedstream is removed as a liquid residue stream, 103. The non-permeating liquid residue has a lower organic content than the feed. Typically the pervaporation process should remove 80-90% of the organic content of the feed, and most preferably 95% or more. The first permeate vapor stream, 104, is passed to condenser 105 to form first permeate liquid stream, 108. As in FIG. 1, the non-condensed fraction, 106, of the permeate vapor is removed by a small vacuum pump, 107. The first permeate liquid, 108, contains insufficient organic for decantation, and is passed instead to second membrane unit, 112. The membranes and modules used in the second membrane unit are conveniently, although not necessarily, of the same materials and configuration as those used in the first membrane unit. The second membrane unit has to deal only with the permeate stream from the first unit. Therefore the volume of the second-stage feed is substantially less than the volume of the first-stage feed, so that the membrane area required in the second stage is normally less than that required in the first. In general, the total membrane area of the second stage will be 25% or less than that of the first stage. The organic component of stream 108 again permeates the membrane preferentially to yield a second permeate vapor, 114, which passes through a second condenser, 115, to produce a second permeate liquid, 118. The non-permeating portion, 113, of stream 108 may be recycled to the feed to the first membrane unit. The second permeate liquid is passed to decanter, 109, where it is separated into organic stream, 111, and aqueous stream, 110. The non-condensable fraction, 116, from the second condenser is withdrawn through vacuum pump, 117. The aqueous stream, 110, from the decanter may conveniently, although not necessarily, be recycled, mixed with the first permeate liquid, and reprocessed through the second membrane unit.

Figure 3:
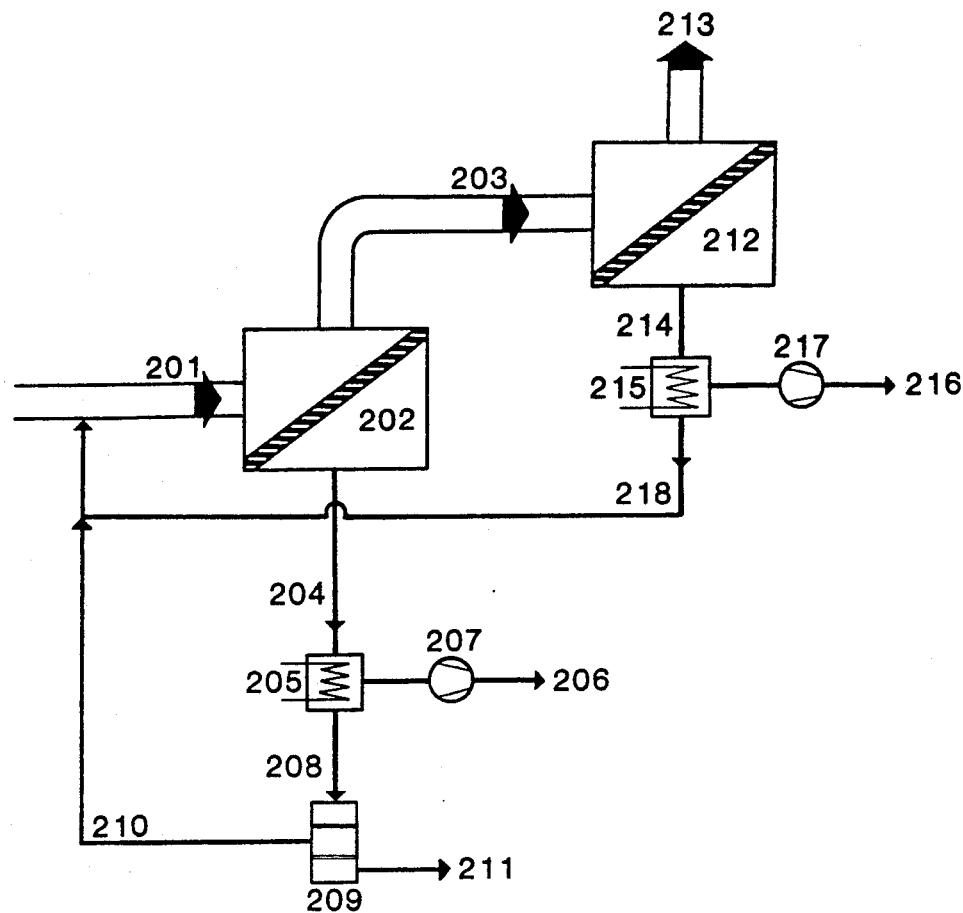
FIG. 3 is a schematic showing an embodiment of the invention incorporating a two-step membrane unit.

A second alternative embodiment may be used when a single pervaporation step produces a residue stream that requires a higher degree of organic removal than can be obtained in a single pass system. A two-step process, in which the residue from the first step is subjected to further treatment, can then be employed. Organic removals of 95-99% are easily achieved, while the concentration of the permeate stream is maintained. The second step required to reduce the feed concentration from say 10% to 1% of the initial value is as large as the first step required to reduce the feed concentration from say 100% to 10% of the initial value. Such a system is shown in FIG. 3. Referring now to this figure, feedstream, 201, comprising an organic solvent in water, is brought into contact with membrane unit, 202. Organic solvent and water vapor permeate the membrane, the organic solvent permeating preferentially. The permeate vapor stream, 204, is cooled in condenser, 205. The non-condensed fraction, 206, of the permeate vapor is removed by vacuum pump, 207. As in FIGS. 1 and 2, the condensed permeate liquid, 208, comprises aqueous and organic phases, which are separated in decanter, 209, and withdrawn as an essentially pure organic stream, 211, and an aqueous stream, 210, which may be returned to the feed side of the first membrane unit. The non-permeating portion of the feedstream, 203, has a lower, but insufficiently low, organic concentration than the feed. Stream 203 is therefore passed to a second membrane unit, 212. The membranes and modules used in the second membrane unit are conveniently, although not necessarily, of the same materials and configuration as those used in the first membrane unit, and the membrane area will be close to the membrane area of the first unit. The organic component of stream 203 again preferentially permeates the membrane to yield a second permeate vapor, 214, which passes through a second condenser, 215, to produce a second permeate liquid, 218. Non-condensed gases, 216, are removed through vacuum pump, 217. Because stream 203 contains substantially less organic than feedstream 201, the second permeate liquid stream, 218, will also contain proportionately less organic, and typically, although not necessarily, will contain too little organic for decantation. Stream 218 may therefore be fed back and mixed with the feedstream entering the first membrane unit. The non-permeating portion, 213, from the second membrane unit preferably has been depleted of organic by at least 95% compared with feedstream 201, and may be discharged or sent to a final polishing step.

It will be apparent to those of ordinary skill in the art that embodiments such as those of FIGS. 2 and 3 may be combined, so that both the residue and the permeate stream from the first membrane unit are subjected to further pervaporation steps. The resulting residue and permeate streams may be recycled and reprocessed as necessary.

Figure 4:
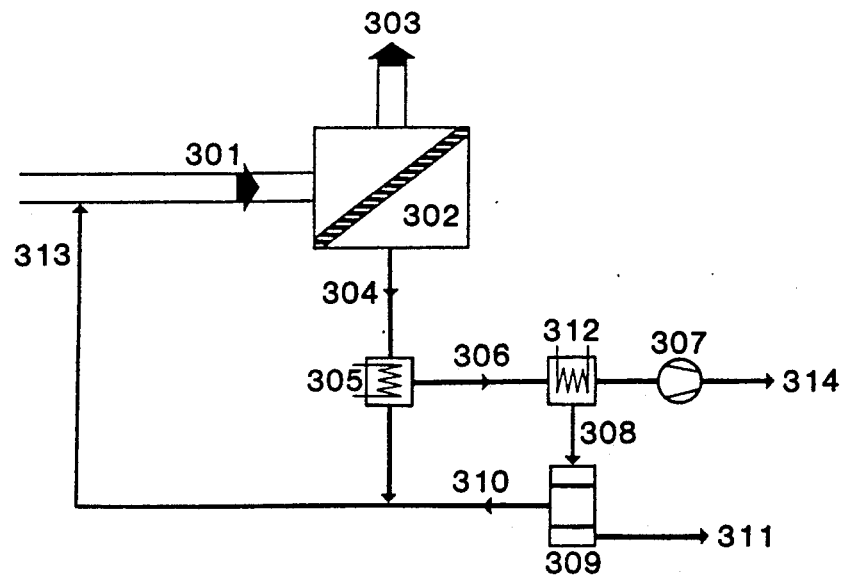
FIG. 4 is a schematic showing an embodiment of the invention incorporating multiple condensers before the decanter.

The embodiments of FIG. 1, FIG. 2 or FIG. 3 may also involve the use of more than one condenser to handle the permeate vapor stream that is to be passed to the decanter. Such an embodiment is shown in FIG. 4. Referring now to this figure, feedstream, 301, contacts membrane unit, 302. The non-permeating portion of the feedstream is removed as a liquid residue stream, 303. The permeate vapor stream, 304, is concentrated in organic, but the composition is such that only a single phase will be present after condensation. The permeate vapor is cooled in condenser, 305, operating at such a temperature that most of the water component of the vapor will condense preferentially, along with some of the organic, to form a liquid aqueous stream, 313, containing a portion of the organic. This stream can be recycled to the feed side of the membrane. The non-condensed stream, 306, which contains most of the organic that permeated the membrane, and is thus concentrated several-fold compared with the permeate vapor stream, is passed to a second condenser, 312, at a different temperature from the first, to yield a condensed permeate liquid, 308. The composition of this liquid is such that it forms two phases. The condensed liquid is separated as before in decanter, 309, to form organic phase, 311, and aqueous phase, 310. The aqueous phase can be combined with the condensate from condenser 305 and returned to the feed side of the membrane. The non-condensed fraction, 314, from the second condenser is removed through vacuum pump, 307.

Figure 5:
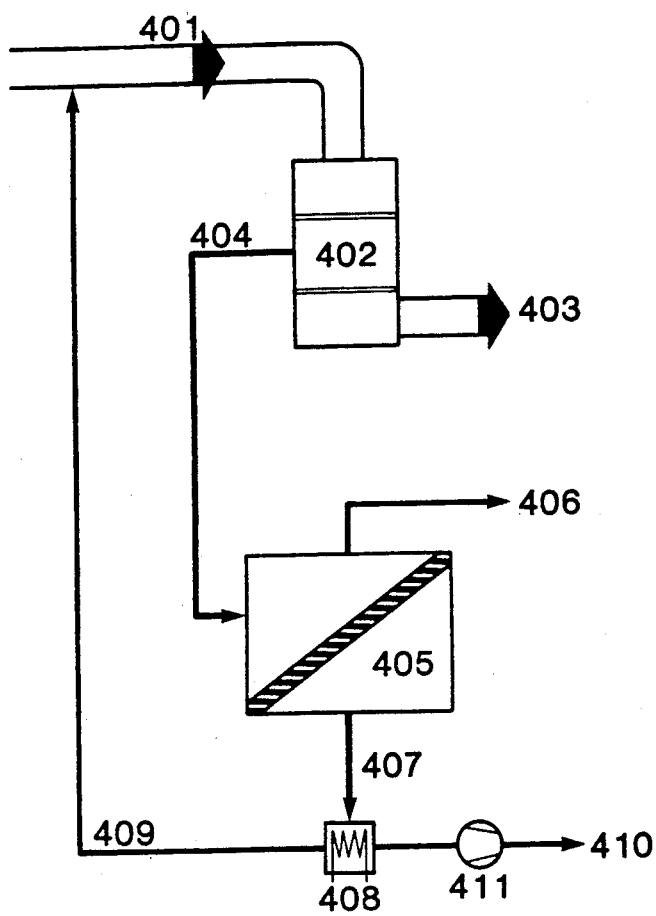
FIG. 5 is a schematic showing an embodiment of the invention in which the decantation step is followed by the pervaporation step.

In all the above representative embodiments, processes have been described in which the pervaporation step is performed first. This will be the preferred scenario where the feedstream to be treated by the hybrid process contains the two components to be separated in such proportions that the minor component is fully dissolved in the major component. If the feedstream contains the minor component in amounts significantly above the solubility limit, then the hybrid process can be carried out by performing the decantation step first, then feeding the aqueous phase from the decanter to a pervaporation unit. Such an embodiment is shown in FIG. 5. Referring now to this figure, feedstream, 401, enters decanter, 402, where it is phase separated to produce an organic product phase, 403, and an aqueous phase containing dissolved organic, 404. Stream 404 then passes to the membrane unit, 405, where it is treated by pervaporation. The non-permeating aqueous portion of the stream is removed as liquid residue stream, 406. The permeate vapor stream, 407, is condensed in condenser, 408, to produce a liquid stream, 409, sufficiently enriched in organic that it can be fed back to the decanter for phase separation. As before, any non-condensed gases, 410, are removed from the condenser through vacuum pump, 411. As with the embodiments in which the pervaporation step is performed first, multistage and/or multistep pervaporation units may be used, and the condensation step may be carried out using more than one condenser at different temperatures.

The choice as to whether to carry out the decantation step or the pervaporation step first can be made on the basis of the composition of the stream to be treated. Obviously, if the stream is a single-phase solution, the pervaporation treatment must precede decantation. If the feed is a two-phase mixture, then decantation can be used to perform the gross separation, followed by pervaporation to remove that portion of one phase that is dissolved in the other. In either case, using embodiments such as the representative ones described above, the hybrid pervaporation/decantation process can be designed to produce only two outlet streams: an aqueous stream with a very small residual organic content, and a high-purity organic stream that may be recovered and reused.

The hybrid pervaporation/decantation process of the invention can be used to handle a broad range of aqueous streams with an organic content from very dilute (100 ppm or less) to very concentrated (50+% organic). The organic phase may be initially completely dissolved in the aqueous phase, or the initial feedstream may be a two-phase mixture. From an economic point of view, the new process can be most competitive with conventional technologies where the organic content renders the stream too concentrated for carbon adsorption or biological treatment, and too dilute for incineration. The preferred minimum organic concentration is above about 0.001%, more preferably above about 0.01%, and most preferably above about 0.1%. The preferred maximum concentration is below about 20%, more preferably below about 15%, and most preferably below about 10%. After treatment, the degree of organic removal from the feedstream should preferably be not less than 80%, more preferably not less than 90%, and most preferably not less than 95%. The concentration of organic in the organic-rich phase from the decanter should preferably be not less than 90%, more preferably not less than 95%, and most preferably not less than 98%. The invention is particularly useful as a method of treating aqueous streams containing organic components that are sparingly soluble in water. Preferably the solubility of the organic component in water should be less than 20%, and most preferably less than 5%.

The process of the invention can also be used to handle organic mixtures, such as those containing phenols, toluenes, benzenes, xylenes, cresols, esters, such as ethyl acetate or butyl acetate, chlorinated hydrocarbons, such as perchloroethylene, trichloroethylene, trichloroethane, chlorinated fluorocarbons, ketones, such as methyl ethyl ketone, alcohols, such as butanol, hexanol or octanol, naphthas and aliphatic hydrocarbons, such as hexane, octane or decane, or terpenes, such as those found in various wood product streams. The pervaporation step is particularly useful in separating azeotropic or closely-boiling organic mixtures. The invention is now further illustrated by the following examples, which are intended to be illustrative of the invention, but are not intended to limit the scope or underlying principles of the invention in any way.

EXAMPLES

Experimental procedure

A bench-top pervaporation unit was used to evaluate the removal of dissolved organic compounds from aqueous streams. The unit has a 10 gallon feed tank with a heater, from which the feedstream was pumped by a centrifugal pump through a single spiral-wound module. The module contained a thin-film composite membrane with a membrane area of 0.18 m². The residue stream from the module was returned to the feed tank. The permeate vapor was passed to a condenser vessel cooled with liquid nitrogen to trap the water and solvent vapors. The system incorporated two traps, so that the permeate stream could be switched from one to the other to allow the permeate stream to be sampled periodically without interrupting operation of the unit. Non-condensable gases were withdrawn through a rotary vane vacuum pump and vented. The condensed permeate was drawn off and left to settle.

EXAMPLE 1

A sample from a decanter in a benzene plant was run through the bench-top unit. The operating conditions were as follows:
Sample volume: 22.7 L
Sample content: Benzene: 30-32 mL
Feed temperature: 40° C.
Feed flow: 6 L/min
Permeate pressure: 15 mmHg The feed volume was circulated continuously and feed and permeate samples were taken every hour. Feed and permeate samples were analyzed using a gas chromatograph with a flame ionization detector. One-µL samples of the feed and permeate streams were injected into a 10% SP-1000, 80/100 Carbopack, 6-ft×18-in column (Supelco, Bellefonte, Pa.) at a column operating temperature of 220° C. The chromatogram showed a small peak as the sample was injected and a peak for the benzene two minutes later. No peaks were measured for any other components in the sample since they were present in very low concentrations.

Table 1 shows the permeate fluxes, and the total concentration of benzene in the permeate vapor before condensation. As shown, the benzene was very dramatically enriched in the permeate, producing streams 100 to 500 times more concentrated than the feed. The condensed permeate settled within a few minutes into two phases, the top layer containing nearly pure benzene, the bottom layer consisting of a saturated benzene solution. The weights of these two phases are also shown in Table 1.

TABLE 1

| | Permeate Composition and Permeate Flux Data from Benzene Separation Pervaporation Experiments | | | | |
|---|---|---|---|---|---|
| Time (h) | Total Permeate Benzene Conc. (%) | Permeate Benzene Phase (mL) | Permeate Aqueous Phase (mL) | Total Weight of Permeate Sample (g) | Permeate Flux (kg/m²·h) |
| 1 | 17.2 | 26 | 112 | 135 | 0.75 |
| 2 | 4.3 | 5 | 102 | 104 | 0.58 |
| 3 | 1.0 | 2 | 101 | 102 | 0.57 |
| 4 | 0.2 | —* | 102 | 101 | 0.56 |

*This sample contained only one phase.

Figure 6:
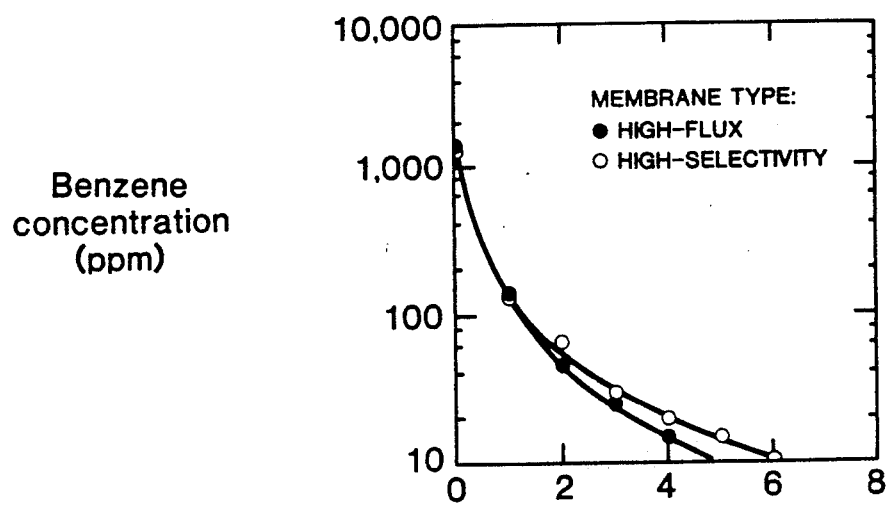
FIG. 6 is a graph of benzene concentration in the feedstream as a function of time for pervaporation experiments in which the feed was continuously circulated, using membrane modules containing (a) ● high-flux membranes and (b) ○ high-selectivity membranes.
Figure 7:
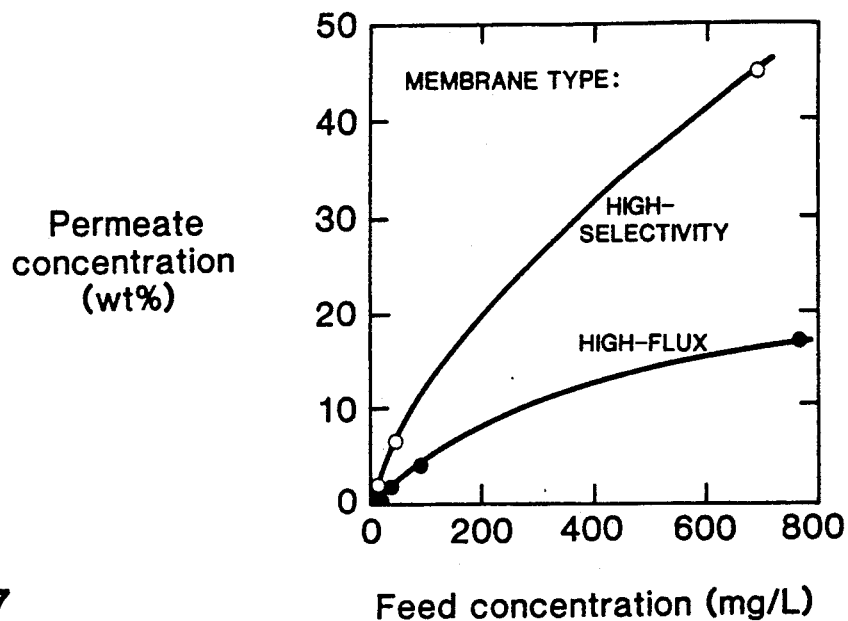
FIG. 7 is a graph of benzene concentration in the permeate stream as a function of benzene concentration in the feedstream for pervaporation experiments in which the feed was continuously circulated, using membrane modules containing (a) ● high-flux membranes and (b) ○ high-selectivity membranes.

The feed concentration of the benzene as a function of time is shown in FIG. 6. As can be seen, over 90% of the benzene was removed from the feed solution in less than two hours, with 99% removal in four hours. The membrane selectivity can be judged by plotting the concentration in the feed solution against the concentration in the permeate vapor before condensation. This plot is shown in FIG. 7. As can be seen, enrichments of 70-230 fold between the feed and the permeate were obtained. When drawn off and left to separate, all permeate samples except the last separated into two phases, an organic phase containing pure benzene and an aqueous phase of benzene-saturated water that was recycled to the feed tank.

Example 2

The experiment as in Example 1 was repeated. The sample used had the same volume and composition, and the experimental set-up was the same, except that a module with higher selectivity, but lower flux, was used. Because the flux was lower, permeate samples were taken two-hourly instead of hourly. The results are summarized in Table 2.

TABLE 2

| | Permeate Composition and Permeate Flux Data from Benzene Separation Pervaporation Experiments | | | | |
|---|---|---|---|---|---|
| Time (h) | Total Permeate. Benzene Conc. (%) | Permeate Benzene Phase (mL) | Permeate Aqueous Phase (mL) | Total Weight of Permeate Sample (g) | Permeate Flux (kg/m²·h) |
| 2 | 45.4 | 27 | 29 | 53 | 0.15 |
| 4 | 6.7 | 1.8 | 23 | 24 | 0.068 |
| 6 | 2.7 | 0.5 | 23 | 23 | 0.063 |

The feed concentration of the benzene as a function of time is shown by the open circles in FIG. 6. The permeate concentration versus feed concentration is shown in FIG. 7. Enrichments of 500-1,000 fold between the feed and the permeate were obtained. When drawn off and left to separate, all permeate samples yielded two phases, an organic phase containing pure benzene and an aqueous phase of benzene-saturated water that was recycled to the feed tank.

Example 3

Figure 8:
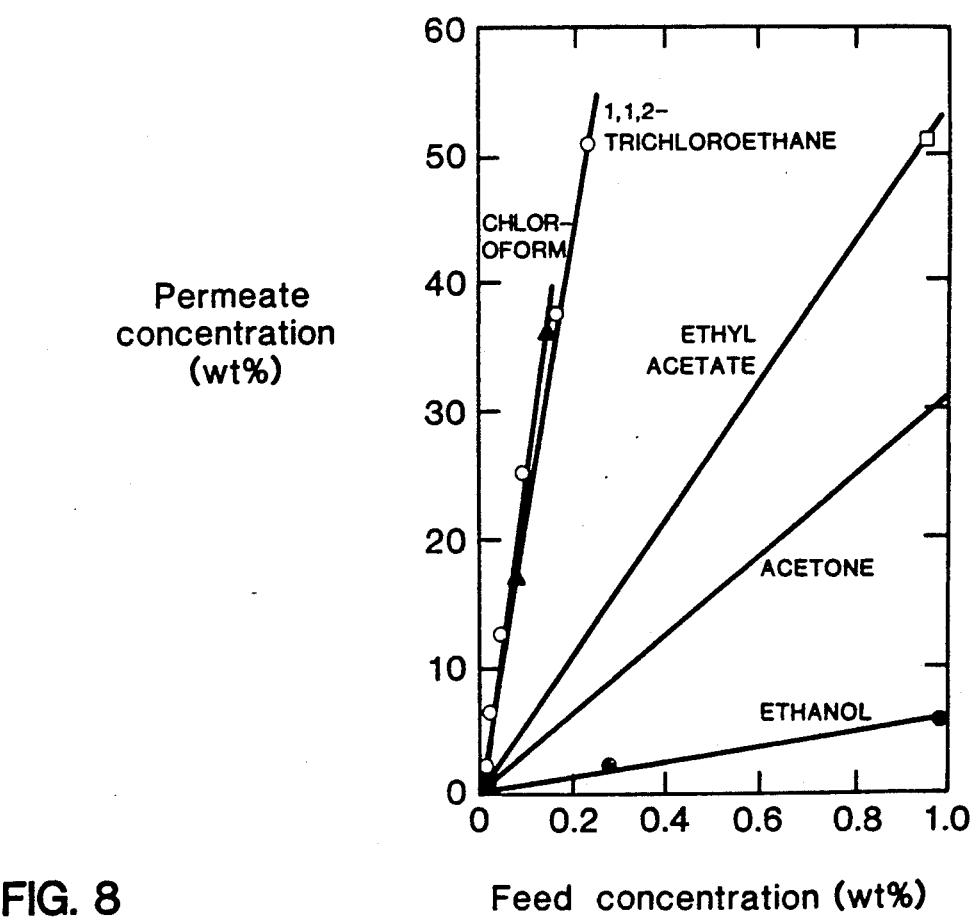
FIG. 8 is a graph of organic concentration in the permeate stream as a function of organic concentration in the feedstream for a series of pervaporation experiments.

The experiment as in Example 1 was repeated with a solution of ethanol in water. The results are summarized in the lowest curve of FIG. 8. The membrane selectivity measured was up to about 5. The permeate was a more concentrated solution of alcohol in water. The permeate from this single-stage experiment was unsuitable for decantation.

Example 4

The experiment as in Example 1 was repeated with a solution of acetone in water. The results are summarized in the second lowest curve of FIG. 8. The membrane selectivity measured was up to about 30. The permeate was a more concentrated solution of acetone in water. As in Example 3, the permeate was a single phase solution unsuitable for decantation.

Example 5

The experiment as in Example 1 was repeated with a solution of ethyl acetate in water. The results are summarized in the middle curve of FIG. 8. The membrane selectivity measured was up to about 55. The solubility of ethyl acetate in water at ambient temperatures is about 8.2%; therefore the permeate forms a two-phase mixture that can be decanted.

Example 6

The experiment as in Example 1 was repeated with a solution of 1,1,2-trichloroethane in water. The results are summarized in the second highest curve of FIG. 8. The membrane selectivity measured was up to about 235. When drawn off and decanted, the permeate can be separated into a pure 1,1,2-trichloroethane phase and an aqueous phase.

Example 7

The experiment as in Example 1 was repeated with a solution of chloroform in water. The results are summarized in the highest curve of FIG. 8. The membrane selectivity measured was up to about 250. When drawn off and decanted, the permeate can be phase-separated to yield essentially pure chloroform and an aqueous phase.

Example 8

The experiment as in Example 1 was repeated with an effluent sample from apple juice processing. The sample consisted of a portion of the evaporator condensate stream produced during the juice concentration process. The condensate contains essence, the organic components that impart apple flavor and aroma. These components, which consist of a complex mixture of esters, aldehydes, ketones and alcohols, were present at a feed concentration of approximately 1 wt %. The results are summarized in Table 3. Because the exact concentration of the organic components in the feed is not known, all concentrations in the table are expressed as multiples of the feed concentration, which was assumed to be 1%.

TABLE 3

Permeate Compositions and Fluxes in Apple Juice Processor's Stream Sample Pervaporation Experiments

| Test Conditions | | | | |
|---|---|---|---|---|
| Permeate Pressure | | - | 20 mmHg | |
| Temperature | | | 40° C. | |
| Membrane area | | | 1,800 cm$^2$ | |

All concentrations shown are given as multiples of the initial feed concentration, which was approximately 1.0 wt %.

| Time (h) | Permeate Conc., both phases (~wt %) | Permeate Organic Phase Volume (mL) | Permeate Aqueous Phase Volume (mL) | Total Permeate Flux (kg/m$^2$ · h) |
|---|---|---|---|---|
| 1 | 31 | 10 | 120 | 0.71 |
| 2 | 20 | 2 | 115 | 0.64 |
| 3 | 15 | — | 101 | 0.55 |

TABLE 3-continued

Permeate Compositions and Fluxes in Apple Juice Processor's Stream Sample Pervaporation Experiments

| 4 | 11 | — | 106 | 0.58 |
|---|---|---|---|---|

Initial feed volume, 18.0 liters; initial feed concentration, ~1.0 wt %. Final feed volume, 17.5 liters; final feed concentration, ~0.7 wt %.

As can be seen, the combined pervaporation/decantation process produced a small volume, highly concentrated organic phase that would be suitable for adding back to the apple juice product, or for other use in the flavor and fragrance industries.

Example 9

The experiment as in Example 8 was repeated using the same membrane as in Example 2. The results are summarized in Table 4.

TABLE 4

Permeate Compositions and Fluxes in Apple Juice Processor's Stream Sample Pervaporation Experiments

| Test conditions | |
|---|---|
| Permeate pressure | 20 mmHg |
| Temperature | 40° C. |
| Membrane area | 1,800 cm$^2$ |

All concentrations shown are given as multiples of the initial feed concentration, which was approximately 1.0 wt %.

| Time (h) | Permeate Conc., both phases (~wt %) | Permeate Organic Phase Volume (mL) | Permeate Aqueous Phase Volume (mL) | Total Permeate Flux (kg/m$^2$ · h) |
|---|---|---|---|---|
| 2 | 27 | 9 | 24 | 0.087 |
| 6 | 24 | 6 | 45 | 0.068 |
| 10 | 22 | 1 | 44 | 0.059 |

Initial feed volume, 19.5 liters; initial feed concentration, ~1.0 wt %. Final feed volume, 19.4 liters; final feed concentration, ~0.5 wt %.

Both of the membranes removed approximately the same amount of organic solvent from the feedstream in equivalent time periods. However, the permeate produced by the higher selectivity membrane was slightly more concentrated.

Example 10

Economic Analysis

Using the experimental data of Examples 1 and 2, an economic analysis of a pervaporation system able to treat a 15,000 gal/day stream was performed. In this analysis the feed concentration was assumed to be 1,300 ppm benzene and the desired residue concentration, 130 ppm. That is, 90% benzene removal is achieved. The temperature of the wastewater was assumed to be 15° C., whereas the modules were assumed to operate at a 60° C. inlet temperature. The pervaporation system design, therefore, would include a heating system to heat the feedstream. However, the bulk of this heat could be recovered by running the hot residue stream (stripped of 90% of the benzene) through a heat exchanger, counter to the incoming cool feed. The process was assumed to be that of FIG. 1, and the compositions of the residue stream, 3, the condensed permeate vapor stream, 8, the aqueous phase, 10, and the organic phase, 11, were calculated by means of a computer program. The calculated system parameters used in the economic calculations are given in Table 5.

TABLE 5

System Parameters for Economic Analysis of Benzene Recovery Process

| Stream | Flow (gal/day) | Concentration (% Benzene) |
| --- | --- | --- |
| Feed | 15,000 | 0.13 |
| Residue | 14,980 | <0.01 |
| Condensed permeate | 180 | 11.0 |
| Aqueous phase from decanter | 160 | ~0.2 |
| Organic phase from decanter | 20 | >99.0 |

Membrane area required:
Example 1: 60 m$^2$
Example 2: 75 m$^2$

The products of the pervaporation/decantation process are, thus, 14,980 gal/day of aqueous solution containing <130 ppm benzene (10% of the original concentration) and 20 gal/day pure benzene.

The capital and operating costs, based on the figures in Table 5, were then calculated and are summarized in Table 6.

TABLE 6

Capital and Operating Costs of Pervaporation/Decantation System for Benzene Recovery

| | Example 1 | Example 2 |
| --- | --- | --- |
| CAPITAL COST | $150,000[1] | $160,000[1] |
| OPERATING COST | | |
| Depreciation + interest at 20% (excluding modules) | 24,000 | 24,000 |
| Module Replacement (3-year life) | 12,000 | 15,000 |
| Maintenance (5% of capital cost) | 7,500 | 8,000 |
| Energy | 21,000 | 7,000 |
| TOTAL OPERATING COST | $64,500/yr $13/1,000 gal feed | $54,000/yr $11/1,000 gal feed |

[1] System includes chiller and heater. If cooling water (<10° C.) is available on-site, the capital cost can be decreased by $10,000.

The operating cost of the system using the membranes of Example 2 is $11/1,000 gal feed or $8.20/gal of benzene recovered. The operating costs of a system using the Example 1 membrane are approximately 30% higher. This is mainly because a larger amount of water vapor has to be condensed, increasing the energy requirements of the system.

A substantial credit could be taken in this process for the value of the recovered benzene. In tank car quantities, benzene costs between $4–6/gal. It follows from Table 6 that approximately half of the system's operating costs could be offset by the value of this recovered solvent. This would reduce the total operating costs to $7–9/1,000 gallons of feed, which is extremely competitive with alternative technologies, such as carbon adsorption.

We claim:

1. A separation process, comprising:
 (a) performing a pervaporation step, said step comprising:
  (i) providing a membrane unit having a feed side and a permeate side;
  (ii) contacting said feed side with a feedstream containing a dissolved organic component and a second component;
  (iii) withdrawing from said permeate side a permeate vapor enriched in said organic component compared with said feedstream;
  (iv) withdrawing from said feed side a non-permeating portion of said feedstream;
 (b) condensing said permeate vapor to form a two-phase permeate liquid;
 (c) decanting said permeate liquid to separate said two phases into a first phase having a concentration of said dissolved organic component of at least 90% and a second phase comprising said second component.

2. The process of claim 1 further comprising:
 (d) returning said second phase to the feed side of said membrane unit.

3. The process of claim 1 wherein said condensing step is performed by a first condenser and a second condenser, said condensers being at different temperatures, said permeate liquid being the condensate of the lower-temperature condenser.

4. The process of claim 1, wherein said condensing step is performed by a first condenser and a second condenser, said condensers being at different temperatures, said permeate liquid being the condensate of the higher-temperature condenser.

5. The process of claim 1, wherein said dissolved organic component has a solubility in water at 20° C. of less than 5%.

6. The process of claim 1, wherein the concentration of said dissolved organic component in said non-permeating portion is less than 20%.

7. The process of claim 1, wherein said dissolved organic component is chosen from the group consisting of benzenes, trichloroethanes, ethyl acetate, phenols, toluenes and cresols.

8. The process of claim 1, wherein said dissolved organic component is benzene.

9. The process of claim 1, wherein said dissolved organic component is 1,1,2-trichloroethane.

10. The process of claim 1, wherein said dissolved organic component is ethyl acetate.

11. The process of claim 1, wherein the membrane unit contains a silicone rubber permselective membrane.

12. The process of claim 1, wherein the membrane unit contains a polystyrene-butadiene copolymer permselective membrane.

* * * * *

REEXAMINATION CERTIFICATE (3560th)

United States Patent [19]

Blume et al.

[11] B1 5,030,356

[45] Certificate Issued Jun. 30, 1998

[54] PROCESS FOR RECOVERING ORGANIC COMPONENTS FROM LIQUID STREAMS

[75] Inventors: Ingo Blume, Hengelo, Netherlands; Richard W. Baker, Palo Alto, Calif.

[73] Assignee: Membrane Technology & Research, Inc., Menlo Park, Calif.

Reexamination Request:
No. 90/003,051, May 17, 1993

Reexamination Certificate for:
Patent No.: 5,030,356
Issued: Jul. 9, 1991
Appl. No.: 359,739
Filed: May 31, 1989

[51] Int. Cl.$^6$ ................................................. B01D 61/36
[52] U.S. Cl. ..................................... 210/640; 210/641
[58] Field of Search ............................. 210/640, 641, 210/651, 804, 805; 203/39

[56] References Cited

U.S. PATENT DOCUMENTS

| | | | |
|---|---|---|---|
| 4,082,658 | 4/1978 | Fritzsche et al. | 210/640 |
| 4,944,882 | 7/1990 | Ray et al. | 210/640 |

OTHER PUBLICATIONS

Blume et al., "Separation and ... Pervaporation", from *Proc. 2nd Intl. Conf. . . . Chem Industry*, Mar. 8–11, 1987.
Kirk–Othmer Encyclopedia of Chem.Tech. (3rd ed., 1979, p. 695.
Hackh's Chemical Dictionary, 1972, p. 199.
Boddeker "Pervaporation of Aqueous Phenols", from *Proc. 2nd Intl. Conf. . . . Chem. Industry*, Mar. 8–11, 1987.
Eustache et al., "Separation of Aqueous . . . Mass Spectrometer", from *J. Membrane Science*, 1981, pp. 105–114.
Kaschemekat et al., "Separation of ... Pervaporation", from *Proc. 3rd Intl. Conf. . . . Chem. Industry*, Sep. 1988, pp. 406–413.
Bengtson et al., "Pervaporation . . . from Water", from *Proc. 3rd Intl. Conf. . . . Interim*, Sep. 1988, pp. 439–448.
Brun et al., "Sorption and Pervaporation . . . Polymer Membranes", from *J. Membrane Science*, 1985, pp. 55–100.

*Primary Examiner*—Joseph Drodge

[57] ABSTRACT

A separation process for recovering organic components from liquid streams. The process is a combination of pervaporation and decantation. In cases where the liquid stream contains the organic to the separated in dissolved form, the pervaporation step is used to concentrate the organic to a point above the solubility limit, so that a two-phase permeate is formed and then decanted. In cases where the liquid stream is a two-phase mixture, the decantation step is performed first, to remove the organic product phase, and the residue from the decanter is then treated by pervaporation. The condensed permeate from the pervaporation unit is sufficiently concentrated in the organic component to be fed back to the decanter. The process can be tailored to produce only two streams: an essentially pure organic product stream suitable for reuse, and a residue stream for discharge or reuse.

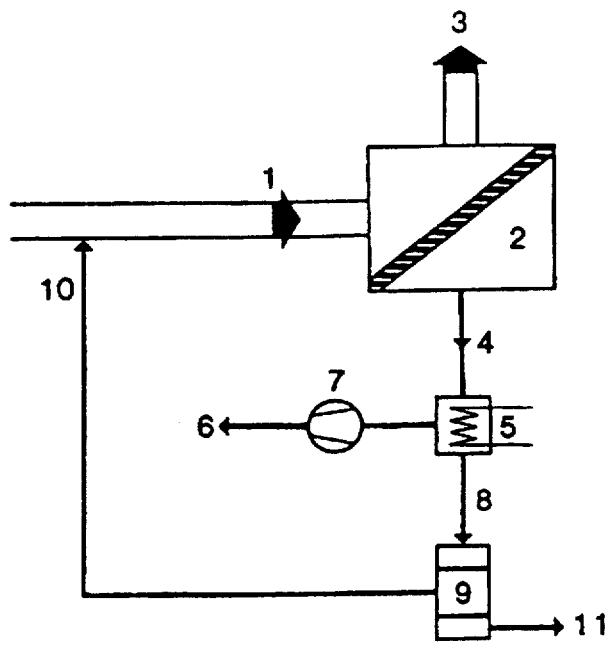

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–12 are cancelled.

New claims 13–32 are added and determined to be patentable.

*13. A separation process, comprising:*
  *a) performing a pervaporation step, said step comprising:*
    *i) providing a membrane unit having a feed side and a permeate side;*
    *ii) contacting said feed side with a feedstream containing a dissolved organic component and a second component, said dissolved organic component being present in a concentration that is below saturation concentration of said dissolved organic component in said second component;*
    *iii) withdrawing from said permeate side a permeate vapor enriched in said organic component compared with said feedstream;*
    *iv) withdrawing from said feed side a non-permeating portion of said feedstream;*
  *b) condensing said permeate vapor to form a two-phase permeate liquid;*
  *c) decanting said permeate liquid to separate said two phases into a first phase having a concentration of said dissolved organic component of at least 90% and a second phase comprising said second component and saturated in said dissolved organic component;*
  *d) returning said second phase to the feed side of said membrane unit, thereby mixing said dissolved organic component saturated second phase with said dissolved organic component unsaturated feedstream.*

*14. The process of claim 13, wherein said condensing step is performed by a first condenser and a second condenser, said condensers being at different temperatures, said permeate liquid being the condensate of the lower-temperature condenser.*

*15. The process of claim 13, wherein said condensing step is performed by a first condenser and a second condenser, said condensers being at different temperatures, said permeate liquid being the condensate of the higher-temperature condenser.*

*16. The process of claim 13, wherein said dissolved organic component has a solubility in water at 20° C. of less than 5%.*

*17. The process of claim 13, wherein the concentration of said dissolved organic component in said non-permeating portion is less than 20%.*

*18. The process of claim 13, wherein the membrane unit contains a silicone rubber permselective membrane.*

*19. The process of claim 13, wherein at least 80% of said dissolved organic component is removed from said feedstream.*

*20. The process of claim 13, wherein at least 90% of said dissolved organic component is removed from said feedstream.*

*21. The process of claim 13, wherein at least 95% of said dissolved organic component is removed from said feedstream.*

*22. The process of claim 13, wherein the concentration of said dissolved organic component in said feedstream is at least 10 ppm.*

*23. The process of claim 13, wherein the concentration of said dissolved organic component in said feedstream is at least 100 ppm.*

*24. The process of claim 13, wherein the concentration of said dissolved organic component in said feedstream is at least 1,000 ppm.*

*25. The process of claim 13, wherein said second component is water.*

*26. The process of claim 13, wherein said second component is an organic compound.*

*27. The process of claim 13, wherein said decanting produces a first phase having a concentration of said dissolved organic component of at least 95%.*

*28. The process of claim 13, wherein said decanting produces a first phase having a concentration of said dissolved organic component of at least 98%.*

*29. The process of claim 13, wherein said permeate liquid has an organic content at least 50% greater than can be dissolved under the operating conditions of said process.*

*30. The process of claim 13, wherein said dissolved organic component is chosen from the group consisting of benzenes, toluenes, and xylenes.*

*31. The process of claim 13, wherein said dissolved organic component is chosen from the group consisting of chlorinated hydrocarbons.*

*32. The process of claim 13, wherein said dissolved organic component is chosen from the group consisting of esters.*

* * * * *